United States Patent
Noda et al.

[11] Patent Number: 5,806,377
[45] Date of Patent: Sep. 15, 1998

[54] STEERING COLUMN COVER

[75] Inventors: Kazushi Noda, Ichinomiya; Makoto Kanai, Gifu-ken, both of Japan

[73] Assignee: Toyota Gosei Co., Ltd., Aichi-ken, Japan

[21] Appl. No.: 769,401

[22] Filed: Dec. 19, 1996

[30] Foreign Application Priority Data

Dec. 20, 1995 [JP] Japan .................................. 7-331863

[51] Int. Cl.⁶ ........................................................ B62D 1/04
[52] U.S. Cl. ............................................ 74/552; 280/731
[58] Field of Search ............................. 74/552; 280/731; 439/372, 34, 142

[56] References Cited

U.S. PATENT DOCUMENTS

| | | | |
|---|---|---|---|
| 2,622,690 | 12/1952 | Barenyi | 74/552 X |
| 3,242,900 | 3/1966 | Howard | 74/552 X |
| 4,400,012 | 8/1983 | Otsuka | 280/777 |
| 4,578,592 | 3/1986 | Nakazawa et al. | 74/552 X |
| 4,960,292 | 10/1990 | Sadler | 280/731 |
| 5,046,757 | 9/1991 | Sadler et al. | 280/731 |
| 5,570,901 | 11/1996 | Fyrainer | 280/731 X |

FOREIGN PATENT DOCUMENTS

| | | | |
|---|---|---|---|
| 3405981 | 8/1985 | Germany | 74/552 |
| 3-48867 | 10/1991 | Japan . | |
| 6298097 | 10/1994 | Japan | 74/552 |

*Primary Examiner*—Charles A. Marmor
*Assistant Examiner*—Mary Ann Battista
*Attorney, Agent, or Firm*—Cushman, Darby & Cushman, IP Group of Pillsbury, Madison & Sutro, LLP

[57] ABSTRACT

A steering column cover is provided with a closeable opening through which the connecting and releasing of a connection between a column side terminal block and a column side connector can be easily accomplished. The opening is closed by a door having a projection for preventing an error in establishing a proper connection.

5 Claims, 2 Drawing Sheets

STEERING COLUMN COVER

The following priority application, Japanese Patent Application No. hei 7-331863, filed in Japan on Dec. 20, 1995, is hereby incorporated by reference into the present specification.

BACKGROUND OF THE INVENTION

1. FIELD OF THE INVENTION

This invention relates to a steering column cover, and more particularly to a steering column cover which covers an electric connector.

2. DESCRIPTION OF RELATED ART

A brush-less connector is becoming increasingly popular instead of a brush-type connector such as shown in Japanese Utility model No. hei 3-48867. Because the brush-less connector ensures an electric connection between a steering wheel and a steering column and is easy to correspond with the increase of a switching channel number, it is possible to concentrate switching functions on a steering wheel.

The conventional brush-less connector comprises a housing and a spiral electric tape cable received in the housing. The housing has a fixing plate that is L-shaped in cross-section and a rotation plate that is also L-shaped in cross-section.

After assembling the steering wheel and the steering shaft together, steering wheel connector is then connected to the column side connector. The column cover itself is attached on the column only after the connector is connected.

The worker assembles the column cover between the steering wheel and the instrument panel. This work has the potential of damaging both the steering wheel and the instrument panel and this assembly approach requires a more complicated procedure.

In addition, for safety reasons, the inflator of an air bag device has to be inflated before a car is scrapped. To accomplish this inflation, a worker will disengage the steering wheel connector from the column side connector, then the worker will connect the column side connection to a connector of a device for inflating the inflator. To do this, the worker will need to remove the column cover to expose the column side connector. This work is also complicated.

SUMMARY OF THE INVENTION

An object of this present invention is to provide a steering column cover which is easily mounted on an automobile. Another object of this present invention is to provide a steering column cover where the column side connector and the steering wheel connector are easily connected and disconnected thereby simplifying connection to a device for inflating the inflator.

A steering column cover according to the present invention comprises a front wall and a bottom wall. The front wall covers a connecting device. The connecting device is located around a boss of a steering wheel. The bottom wall has an opening for connecting to a column side connector. The opening is closed by a door having a projection that prevents errors associated with such connection work.

Thus, the connection work can be performed after fixing the column cover in place. If an error in the connection occurs, the door can not be closed.

In addition, when a car is scrapped, a worker will open the door and release the connection. Then the worker will be able to easily connect the inflator to a connector of a device for actuating the inflator.

DETAILED DESCRIPTION OF THE PREFERRED EMBODIMENT

Figure 1:
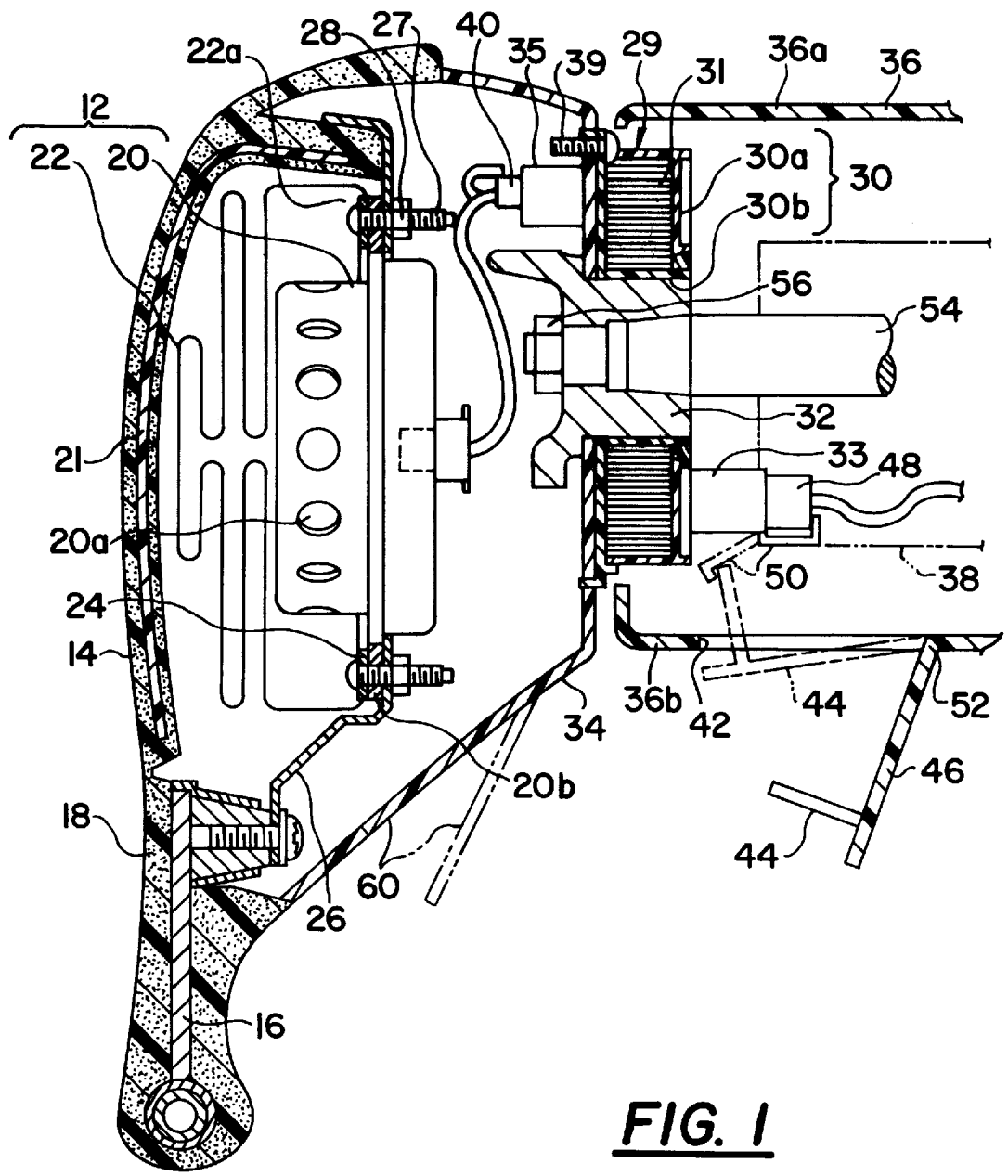
FIG. 1 is a cross-sectional view of an embodiment of the steering wheel and the steering column cover.
Figure 2:
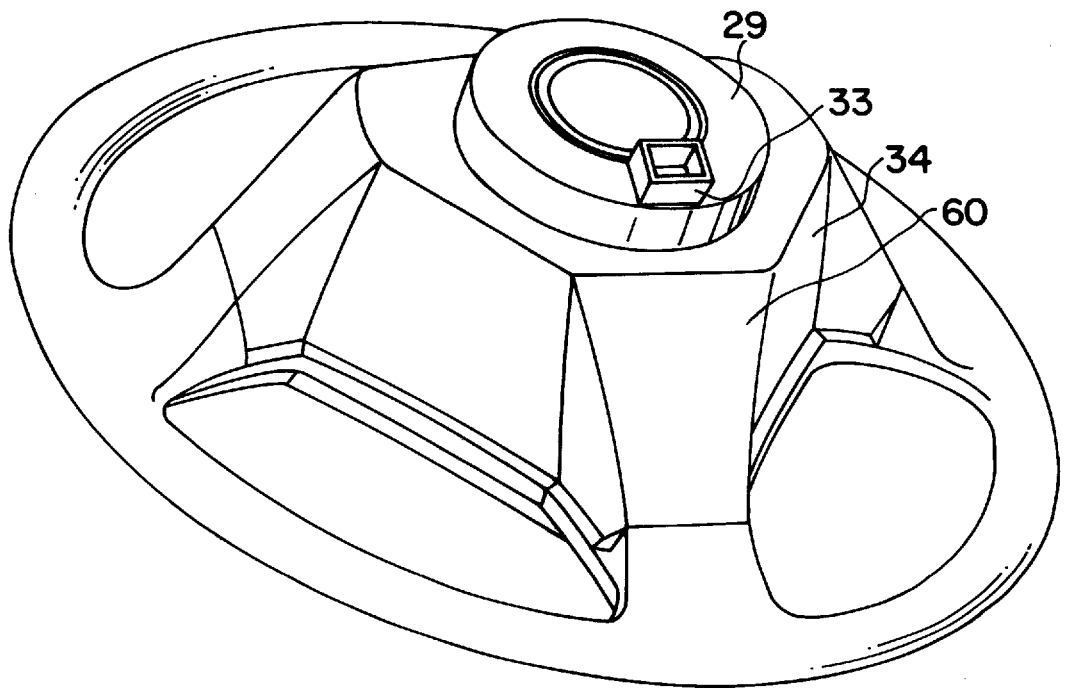
FIG. 2 is a perspective view showing a back side of the steering wheel in FIG. 1.

It will be seen that the steering wheel shown in FIG. 1 and 2 includes an air bag device 12 together with a pad 14 and a steering wheel main core cover 18.

With reference to FIG. 1, the air bag device 12 comprises an inflator 20 and an air bag 22. An opening 22a of the folded air bag 22 covers the aperture 20a of an upper part of the inflator 20 and is attached by flange 20b of the inflator 20 through a push ring 24. The air bag device 12 is installed on a retainer 26, fixed to a main body core 16, through the flange 20b with the opening 22a and the push ring 24, collectively, by using bolts 27 and nuts 28.

A connecting device 29 is located around a boss 32 of the steering wheel and comprises a cross-sectional hollow housing 30 and a tape-type electric wire 31, received in the housing 30. The housing 30 has an L-shaped cross-sectional plate 30a that is fixed in place and an L-shaped cross-sectional plate 30b that is movably mounted. The fixed plate 30a has a column side connector 33. The movable plate 30b has a wheel side connector 35.

The connecting device 29 is located under the lower cover 34 and is fixed on the main body core 16 or the lower cover 34 by screws 39. The wheel side connector 35 is connected to a wheel side terminal block 40, connected to the inflator 20 and a horn switch 21.

Figure 3:
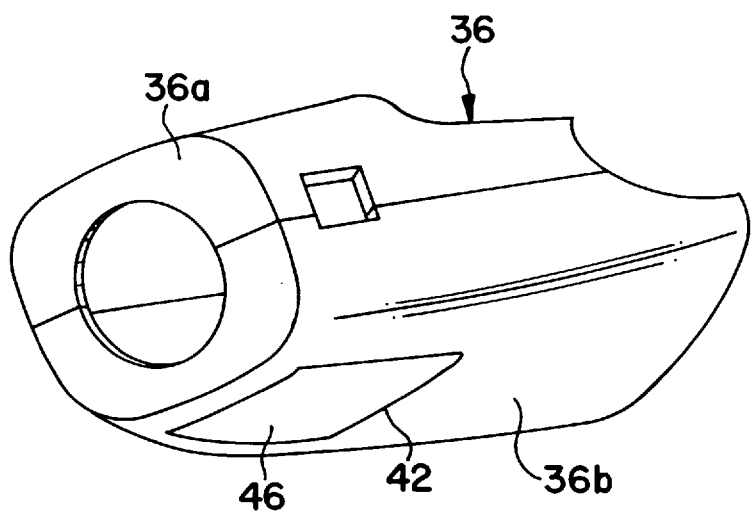
FIG. 3 is a perspective view showing from under side of a steering column cover of the present invention.

The column cover 36 covers the connecting device 29 with a front wall of the column cover 36. The column cover 36 is divided into an upper part 36a and a lower part 36b and is fixed to the steering column 38 mated together as shown in FIG. 3, with one end shown in FIG. 1.

A working opening 42, through which the connecting and releasing of the column side connector, is formed at a lower wall of the column cover 36. The working opening 42 is closable by a door 46 provided with an inwardly directed projection 44 that will assure connector 33 is properly mounted and locked in place by a locking arm 50, as well as preventing the connector 33 from being disconnected. If the locking arm 50 is not locked, the projection 44 would contact the locking arm 50 before the door 46 is completely closed as shown in FIG. 1.

The connecting procedure is as follows. First, a second or column side terminal block or plug 48, positioned near or within the steering column 38, is connected to or plugged into the column side connector 33 to form an electrical connection therebetween. Then, a rotatable lock arm 50, mounted to the column side connector 33 is rotated from an unlocked front side position, shown in phantom, to a locked back side position as shown in full line in FIG. 1. In its locked position it locks the column side block 48 to the column side connector 33.

Thus, when the connecting work of the lock arm 50 is not finished, the door 46 can not be closed because of the projection 44 intervening with the lock arm 50 as is shown in phantom in FIG. 1.

Door 46 is connected to the column cover 36 along a back side edge of the door 46 through an integral hinge 52. The free edge of the door 46 can be fixed by a screw or a spring clip (not shown). The door 46 can also be fixed by screws or clips without the integral hinge 52.

Use of this embodiment is explained as follows. First, the steering wheel, equipped with the air bag device 12 and the connecting device 29, is attached by a nut 56 on the end of the steering shaft 54 that projects from the opening 36a in the column cover 36. This work is done through an open door 60, as indicated in phantom in FIG. 1.

Next, through an open door 46 to the column side terminal block 48 is connected to the column side connector 33 and the lock arm 50 is rotated into its locked full line position connection. Then the door 46 is closed. If the lock arm 50 is not rotated into its locked position, door 46 can not be closed because projection 44 will interfere with the lock arm 50. Thus, errors in the connection between the column side terminal block 48 and the column side connector 33 can be prevented.

In addition, when a car is scrapped, the inflator for the air bag device needs to be inflated before the steering wheel is removed from the car and this can be accomplished using the same opening. First, the door 46 is opened. Then, the connection between the column side terminal block 48 and the column side connector 33 is released. The column side connector 33 can thereafter be connected to a device for inflating the inflator. Finally, the device is activated and the inflator inflates.

This invention can apply a steering wheel without an air bag device or a steering wheel separated with a pad and a main core cover.

What is claimed is:

1. A steering column cover, located around an electric connecting device which is located around a boss of a steering wheel, comprising:

a lower wall of said cover having an opening formed therein, said opening being closed with a door mounted to said cover, said door having an inwardly extending projection mounted thereon, wherein when said electric connecting device is improperly connected, a locking mechanism mounting said electric connecting device is improperly positioned, said improperly positioned locking mechanism causing interference with said projection of said door and preventing closure of said door.

2. The steering column cover of claim 1, wherein the door is integrally formed with said cover.

3. The steering column cover of claim 1, wherein said door is joined to said steering column cover with a hinge.

4. The steering column cover of claim 1, wherein said electric connecting device provides an electrical connection to said steering wheel of a vehicle and a plug member connected to said electric connecting device provides an electrical connection to an electrical system of said vehicle.

5. The steering column cover of claim 1, wherein said steering wheel has an air bag device, a pad, and a core cover portion, wherein said pad and said core cover portion are formed together.

\* \* \* \* \*